US012587626B2

(12) United States Patent
Han et al.

(10) Patent No.: US 12,587,626 B2
(45) Date of Patent: Mar. 24, 2026

(54) DYNAMIC DISPLAY FORMATS FOR HEAD-UP DISPLAY (HUD) FIELD OF VIEW

(71) Applicant: Rockwell Collins, Inc., Cedar Rapids, IA (US)

(72) Inventors: David I. Han, Lake Oswego, OR (US); Ian J. Bull, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/813,943

(22) Filed: Aug. 23, 2024

(65) Prior Publication Data

US 2026/0059086 A1 Feb. 26, 2026

(51) Int. Cl.
| | |
|---|---|
| *H04N 13/178* | (2018.01) |
| *B64D 43/00* | (2006.01) |
| *H04N 13/139* | (2018.01) |
| *H04N 13/302* | (2018.01) |
| *H04N 13/383* | (2018.01) |

(52) U.S. Cl.
CPC ........... *H04N 13/178* (2018.05); *B64D 43/00* (2013.01); *H04N 13/139* (2018.05); *H04N 13/302* (2018.05); *H04N 13/383* (2018.05)

(58) Field of Classification Search
CPC .. H04N 13/178; H04N 13/139; H04N 13/302; H04N 13/383; B64D 43/00
USPC ........................................................ 348/51
See application file for complete search history.

(56) References Cited

U.S. PATENT DOCUMENTS

| | | | | |
|---|---|---|---|---|
| 7,397,606 | B1 * | 7/2008 | Peng | G02B 27/0101 |
| | | | | 359/630 |
| 9,377,852 | B1 * | 6/2016 | Shapiro | G06F 3/0482 |
| 9,679,367 | B1 | 6/2017 | Wald et al. | |
| 9,720,235 | B2 * | 8/2017 | Border | G02B 27/017 |
| 10,247,613 | B1 | 4/2019 | Wald et al. | |
| 10,247,941 | B2 | 4/2019 | Fürsich | |
| 10,573,074 | B1 * | 2/2020 | Bull | G06T 3/20 |
| 10,710,740 | B1 * | 7/2020 | Tchon | G08G 5/53 |
| 10,775,634 | B2 | 9/2020 | Tümler et al. | |
| 11,455,810 | B2 | 9/2022 | Edwards et al. | |
| 11,758,119 | B2 | 9/2023 | Brown et al. | |

(Continued)

FOREIGN PATENT DOCUMENTS

| | | |
|---|---|---|
| CA | 3010263 C | 7/2017 |
| EP | 3924767 A1 | 12/2021 |

(Continued)

*Primary Examiner* — Helen Shibru
(74) *Attorney, Agent, or Firm* — Suiter Swantz IP

(57) ABSTRACT

A system and method for dynamic formatting of a vehicle-based head-up display (HUD) provides a HUD including a combiner and graphics processor for generation of display data based on environmental information received from vehicle sensing systems (e.g., flight data collected by avionics systems). The HUD combiner is within the field of view (FOV) of a pilot, vehicle operator, or other user (e.g., partially or fully transparent) and provides the display data within the user's FOV. The HUD includes sensors for monitoring the eye reference point (ERP) distance between the combiner and the user's eyes or head. Based on changes in the ERP distance (e.g., when the user's eyes move relative to the combiner) the HUD reformats the display to ensure that any critical display data is visible to the user at their current ERP distance.

20 Claims, 8 Drawing Sheets

(56)                  References Cited

U.S. PATENT DOCUMENTS

| 12,016,420 B2 * | 6/2024 | Stratton | G02F 1/163 |
| 12,039,958 B2 * | 7/2024 | Hua | G09G 3/001 |
| 12,148,322 B2 * | 11/2024 | Heyd | G06T 7/251 |
| 2012/0224062 A1 | 9/2012 | Lacoste et al. | |
| 2022/0317463 A1 | 10/2022 | Urey et al. | |
| 2022/0348080 A1 | 11/2022 | Sadovitch et al. | |
| 2023/0393396 A1 | 12/2023 | Cho et al. | |
| 2024/0025050 A1 * | 1/2024 | Parastegari | B25J 9/1689 |
| 2024/0103616 A1 | 3/2024 | Yerkes et al. | |
| 2024/0201489 A1 | 6/2024 | Qi | |

FOREIGN PATENT DOCUMENTS

| EP | 3001238 | B1 | 12/2022 |
| EP | 4369077 | A1 | 5/2024 |
| GB | 2472773 | B | 2/2011 |

* cited by examiner

112

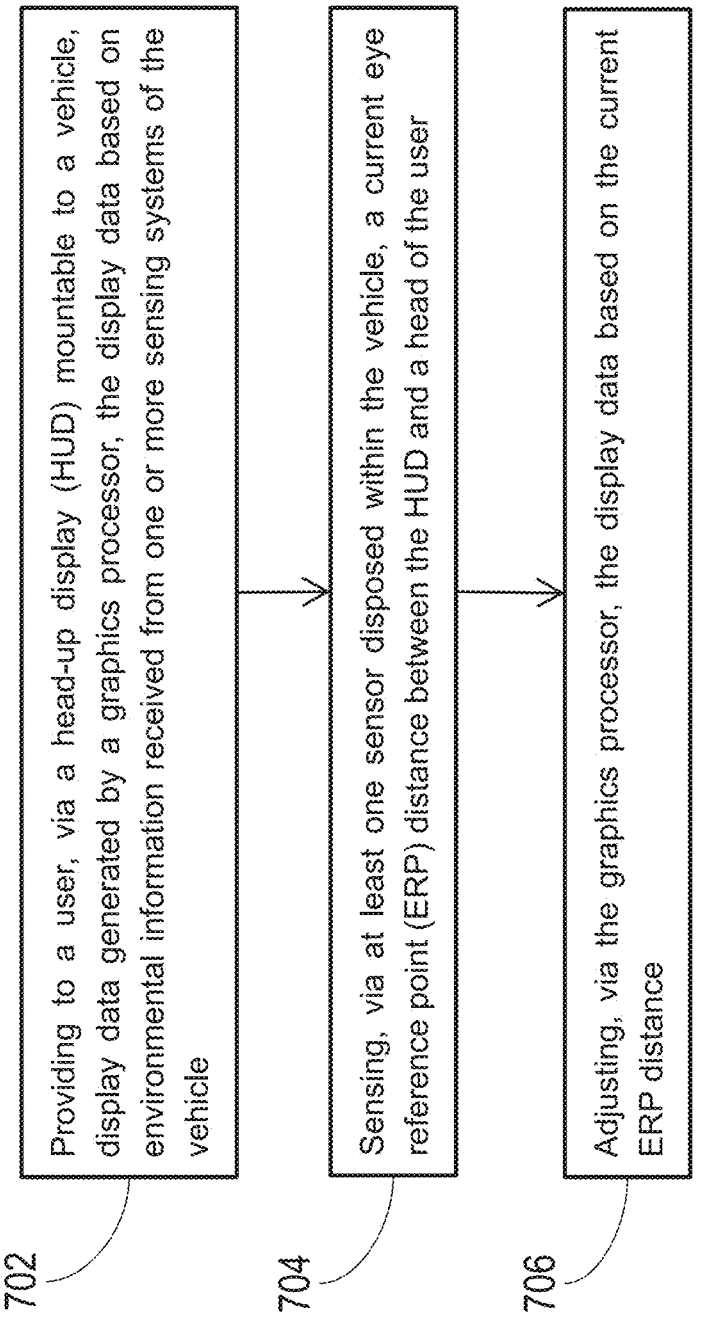

700

702 Providing to a user, via a head-up display (HUD) mountable to a vehicle, display data generated by a graphics processor, the display data based on environmental information received from one or more sensing systems of the vehicle 704 Sensing, via at least one sensor disposed within the vehicle, a current eye reference point (ERP) distance between the HUD and a head of the user 706 Adjusting, via the graphics processor, the display data based on the current ERP distance

*FIG. 7*

DYNAMIC DISPLAY FORMATS FOR HEAD-UP DISPLAY (HUD) FIELD OF VIEW

BACKGROUND

Head-up displays (HUD; also "heads-up display") provide the advantage of projecting primary flight information into the real-world view of a pilot or crewmember, potentially eliminating the need to look down at a conventional head-down display (HDD) unit. Conventional HUD units, for example, provide supplementary flight displays that augment a head-down primary flight display (PFD) in certain flight phases or segments. Next-generation HUD units will need to support use of the HUD as a PFD (where the HDD may not be displayed during selected phases or segments). However, a significant constraint on HUD usage is the requirement that the pilot or user maintain their head within an "eye box" whereby the entire formatted display may be clearly viewed. During the course of a flight, a pilot may adjust their seating position forward or backward, e.g., when the autopilot is engaged. Some seating positions may place the pilot's head outside the eye box, where the HUD field of view is significantly reduced. The inability of the pilot to clearly see or perceive the full set of HUD symbology and/or imagery complicates the use of HUD units as a PFD.

SUMMARY

In a first aspect, a head-up display (HUD) for an aircraft or like vehicle (e.g., airborne, ground-based, water-based) is disclosed. In embodiments, the HUD includes a display unit having a display surface mounted in the field of view (FOV) of a pilot, vehicle operator, or other user (e.g., between the user and the windscreen). The HUD includes graphics processors for receiving environmental and/or flight information sensed by aircraft/vehicle sensors and generating display data based on the sensed information (e.g., symbology or enhancements based on terrain, vehicles, features, or other objects visible through the display surface), and presenting the display data to the user via the display surface. The HUD includes sensors for monitoring the current distance between the display unit and the user's head and/or eyes. For example, if the user moves their head forward or backward, the eye reference point (ERP) distance to the display unit may change. Based on the current ERP distance, and/or the current field of view (FOV) angle between the pilot's head/eyes and the display unit, the graphics processors reformat display data presented to the user to ensure that any and all critical display data is visible and/or perceptible by the user at the current ERP distance.

In some embodiments, based on movement away from the display unit (e.g., increased ERP distance, narrower FOV angle), the graphics processors compress the display data to fit into a reduced portion of the display surface.

In some embodiments, the graphics processors reformat the display data based on one of a set of discrete reference formats, each reference format corresponding to a range of possible ERP distances.

In some embodiments, the display surface is a partially or fully transparent combiner mounted within the field of view of the user.

In some embodiments, the display surface is an interior surface of the aircraft or vehicle, and the display unit includes a projector for presenting the generated display data on the interior surface.

In some embodiments, the interior surface on which the display data is projected is a window, windscreen, or windshield of the aircraft or vehicle.

In some embodiments, the vehicle is an aircraft, the sensing systems include avionics systems (e.g., positioning systems, cameras, image sensors) of the aircraft, and the display data includes flight display data.

In some embodiments, the flight display data presented by the HUD corresponds to a primary flight display (PFD).

In some embodiments, the ERP distance between the display surface and the user's head or eyes is monitored by a camera or proximity sensor.

In some embodiments, the ERP distance corresponds to a distance of a pilot/co-pilot/operator seat from the display unit, and the ERP distance is monitored by sensors within the seat capable of detecting forward or backward motion of the seat and inferring changes in ERP distance and/or FOV angle therefrom.

In a further aspect, a method for dynamic formatting of heads-up display (HUD) content is also disclosed. In embodiments, the method includes providing to a user (e.g., a pilot or operator of an aircraft or other vehicle) display data via a HUD mounted to the vehicle, the display data generated by a graphics processor based on environmental information received from vehicle-based sensing systems, and the HUD presenting the display data via a display surface mounted in the user's field of view (FOV). The method includes sensing, via sensors mounted to the vehicle and oriented at the user, a current eye reference point (ERP) distance between the user's eyes/head and the display surface. The method includes, based on the sensed ERP distance, reformatting or otherwise adjusting the presented display data such that any critical content within the display data is visible and perceptible by the user at the current ERP distance.

In some embodiments, the method includes sensing the current ERP distance via a camera, image sensor, or proximity sensor oriented at the user.

In some embodiments, the method includes sensing the current ERP distance via a sensor based on a seat occupied by the user (e.g., pilot seat, operator seat), In some embodiments, the method includes compressing the display data to fit into a reduced portion of the display surface, based on an increase in the current ERP distance (and a correspondingly narrower field of view angle).

In some embodiments, the method includes redrawing or reformatting the display data based on a reference format selected from a group of two or more discrete reference format, e.g., where each reference format corresponds to a range of ERP distances.

In some embodiments, the method includes providing the display data via a partially or fully transparent combiner mounted in the user's field of view.

In some embodiments, the method includes projecting the display data onto an interior surface of the vehicle.

In some embodiments, the interior surface is a windshield, window, or windscreen of the vehicle.

In some embodiments, the vehicle is an aircraft, and the display data is flight display data based on flight information provided by aircraft-based avionics systems.

In some embodiments, the flight display data corresponds to a primary flight display (PFD).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 7 is a flow diagram illustrating a vehicle-based method for head-up flight display according to example embodiments of this disclosure.

DETAILED DESCRIPTION

Figure 1:
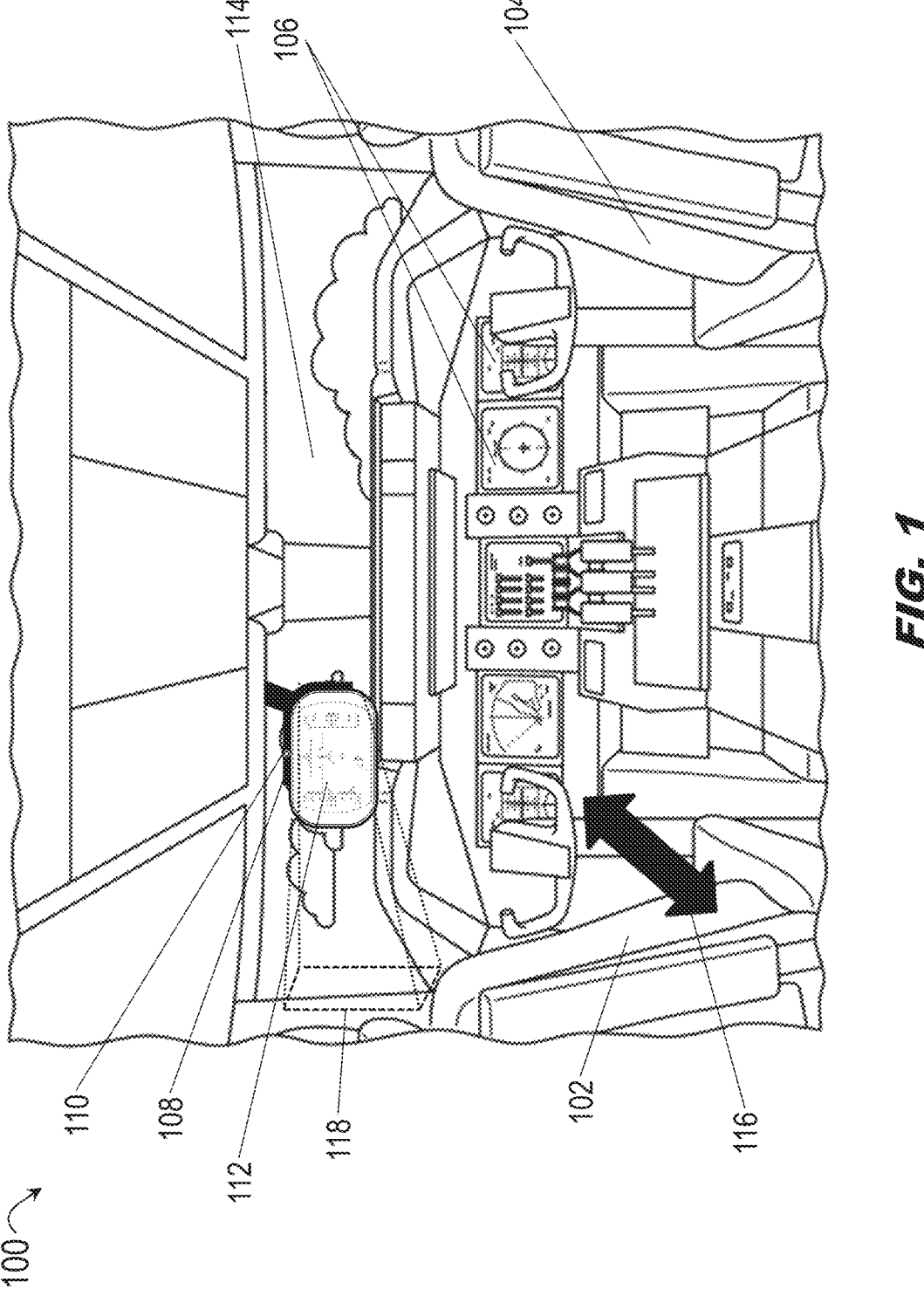
FIG. 1 is a forward-facing illustration of an aircraft cockpit including a head-up display (HUD) unit according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for dynamic adjustment of the HUD display to provide continuous full visibility of HUD symbology and/or imagery through a range of possible positions of the user's head. For example, onboard sensors continually track the position of the user's head relative to the HUD, and adjust the formatting of flight data displayed by the HUD based on the user's current field of view (FOV) such that all critical information is presented within the current FOV. Embodiments of the inventive concepts disclosed herein may be implemented within a cockpit or control space of an aircraft or other vehicle, e.g., ground-based and/or water-based vehicles incorporating an HUD for use by pilots, drivers, and/or crewmembers.

Referring now to FIG. 1, an aircraft 100 or similar vehicle is shown. The aircraft 100 may include, e.g., within a cockpit or control space as shown by FIG. 1, a pilot seat 102, co-pilot seat 104, head-down displays 106 (HDD), head-up displays 108 (HUD), and sensors 110.

In embodiments, the HUD 108 may be positioned directly within a line of sight or field of view (FOV) of a pilot or crewmember occupying the pilot seat 102 (e.g., left-hand seat). Alternatively or additionally, a HUD (not shown) may be positioned in the line of sight or FOV of a co-pilot or crewmember occupying the co-pilot seat 104. For example, the HUD 108 may be mounted within an aircraft cockpit such that the HUD 108 is disposed directly between the pilot's eyes and a forward portion of the windscreen 114.

In embodiments, the HUD 108 may allow the pilot/co-pilot to maintain their eyes forward by presenting (e.g., via a fully or partially transparent HUD combiner 112) critical flight data (e.g., flight path, airspeed, acceleration, attitude, airspeed, altitude, glideslope) conventionally available only by reference to the HDD 106 (e.g., primary flight display (PFD), navigational display). Further, the HUD 108 may provide an enhanced view of any terrain, air traffic, and airspace otherwise visible through the forward windscreen 114. For example, the HUD 108 may provide symbology identifying any manmade or natural features, proximate aircraft, or other objects visible through the forward windscreen 114. Further, the HUD 108 may provide additional visual guidance for night flights and/or degraded visual environments (DVE) via synthetic vision systems (SVS), enhanced vision systems (EVS), and/or combinations thereof (e.g., combined vision systems (CVS)).

In embodiments, the pilot seat 102 (e.g., and the co-pilot seat 104) may be adjustable (116) relative to the HUD 108. For example, once the aircraft has reached a cruising altitude and the pilot has engaged the autopilot system, the pilot may adjust the pilot seat 102 to a more comfortable position associated with a more relaxed monitoring of the aircraft during level flight segments. In embodiments, and as shown in greater detail below, the HUD 108 may be associated with an "eye box" 118 associated with a rough pyramidal frustum (e.g., corresponding to the field of view (FOV) of the HUD) between the HUD and the eyes of the pilot. For example, when the eyes of the pilot are within the eye box 118, any imagery and/or symbology displayed by the HUD 108 will be optimally visible, perceptible, and/or legible to the pilot. However, should the pilot seat 102 be repositioned (116), or the pilot otherwise significantly shift the position of their head backward or forward with respect to the HUD 108, the ability of the pilot to perceive the full set of HUD 108 content may be adversely affected. In embodiments, the HUD 108 may address this issue by reformatting displayed content (e.g., imagery and/or symbology) for optimal perceptibility based on detected changes in the pilot's head position. For example, sensors 110 may track the position of the pilot's eyes and/or head relative to the HUD 108, providing this information to HUD control so that the HUD 108 reformats displayed content. Further, assuming a sufficiently robust display frame rate, any reformatting of displayed content by the HUD 108 responsive to a shift in eye position may occur rapidly enough to appear seamless to the pilot.

In embodiments, the aircraft 100 may include sensors 110 for monitoring the distance between the pilot's eyes and the HUD combiner 112. For example, and as described in greater detail below, sensors 110 may include a pilot-facing camera or image sensor, or a proximity sensor, for determining when the pilot's head, and therefore their eyes, are advancing toward or receding from the HUD combiner 112, e.g., based on a baseline distance corresponding to the eye box 118. The sensors 110 may be mounted to the combiner 112, directly above the windscreen 114 in the pilot's line of sight, or otherwise positioned and oriented to monitor an eye reference point (ERP) distance, or a distance between the pilot's eyes and the combiner.

Figure 2:
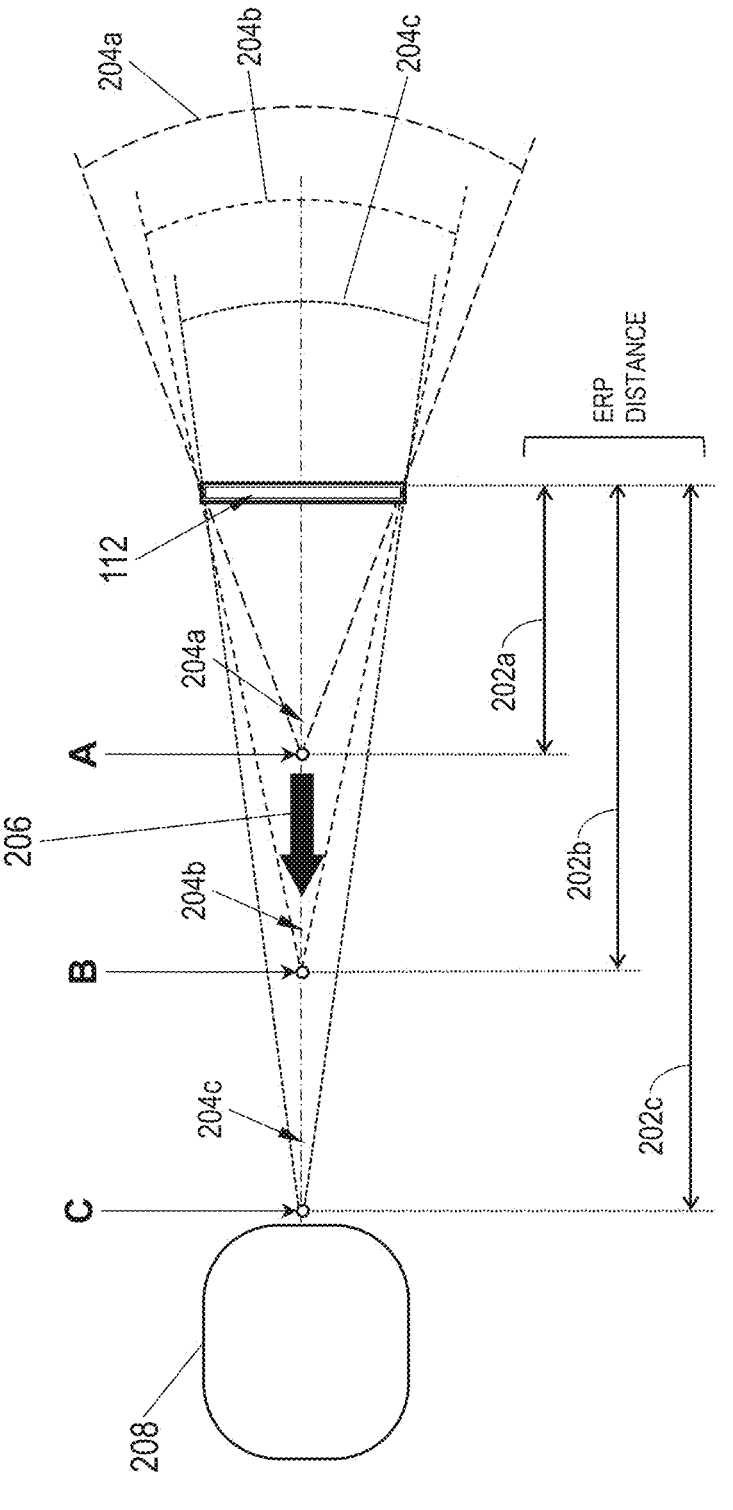
FIG. 2 is a diagrammatic illustration of a relationship between eye reference point (ERP) distance and field of view (FOV) angle with respect to the HUD of FIG. 1.

Referring now to FIG. 2, the aircraft 100 is shown in an overhead view.

In embodiments, assuming an HUD combiner 112 of fixed size (e.g., 8 in≈20.3 cm), an eye reference point A (ERP) at an optimal ERP distance 202a (between the combiner and the eyes of the pilot) corresponding to a field of view (FOV) providing optimal perceptibility of any HUD content presented via the HUD combiner 112 may also correspond to the eye box (118, FIG. 1) as well as a specific FOV angle 204a, e.g., an ERP distance of 10.5 inches (~26.7 cm) and a solid angle of ~42 degrees). If, for example, the pilot repositions (206) their head 208 from point A to point B (and/or repositions (116, FIG. 1) the pilot seat (102, FIG. 1)) such that the ERP distance between the pilot's eyes and the HUD combiner 112 is increased (e.g., to an ERP distance 202b of 20 in≈50.8 cm), the FOV angle may decrease (204b; an FOV angle of ~22.6 degrees) as the pilot's head 208 recedes away from the combiner 112 and eye box 118. Similarly, if the pilot's head 208 moves still further away from the HUD combiner 112 to an even greater ERP distance 202c (e.g., 30 in≈76.2 cm), the FOV angle 204c may decrease still further (e.g., ~15.1 degrees).

In embodiments, the relationship between the size of the HUD combiner 112, the eye reference point (ERP) distance 202a-202c to the pilot's head 208, and the corresponding FOV angle 204a-204c may be expressed as:

$$\tan\left(\frac{1}{2} \times FOV \text{ angle}\right) = \frac{\frac{1}{2} \times \text{combiner size}}{ERP \text{ distance}}$$

$$FOV \text{ angle} = 2 \times \tan^{-1}\left(\frac{\frac{1}{2} \times \text{combiner size}}{ERP \text{ distance}}\right)$$

Figure 3:
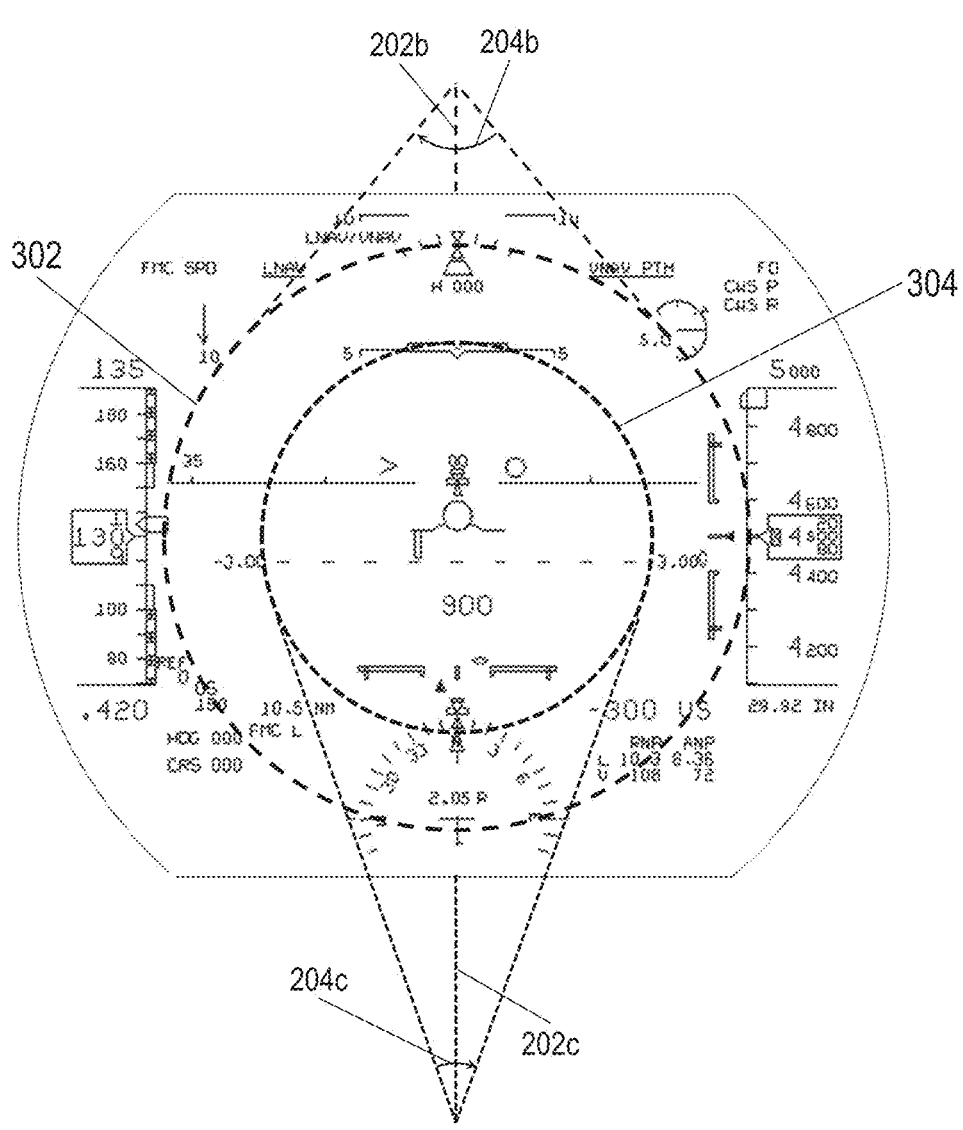
FIG. 3 is a diagrammatic illustration of a relationship between FOV angle and full/partial HUD perceptibility with respect to the HUD of FIG. 1.

Referring also to FIG. 3, the HUD combiner 112 is shown.

The end result of the repositioning 206 of the pilot's head 208 and eyes from a point A within the eye box 118 (e.g., where all content displayed via the HUD combiner 112 is perceptible, corresponding to the FOV angle 204a, FIG. 2) to points B, C more distant from the HUD combiner 112 (and thus behind the eye box), as shown by FIG. 2, is that an increasingly smaller portion 302, 304 or region of the HUD combiner 112 (and any imagery and/or symbology presented thereby) is perceptible by the pilot's eyes, e.g., the portion 302 visible from point B (corresponding to the FOV angle 204b) and the portion 304 visible from point C (corresponding to the FOV angle 204c). Accordingly, critical flight data presented by the HUD 108 may not be perceived by the pilot from point B if it is presented outside the region 302, and may not be perceived from point C if it is presented outside the region 304.

Figure 4:
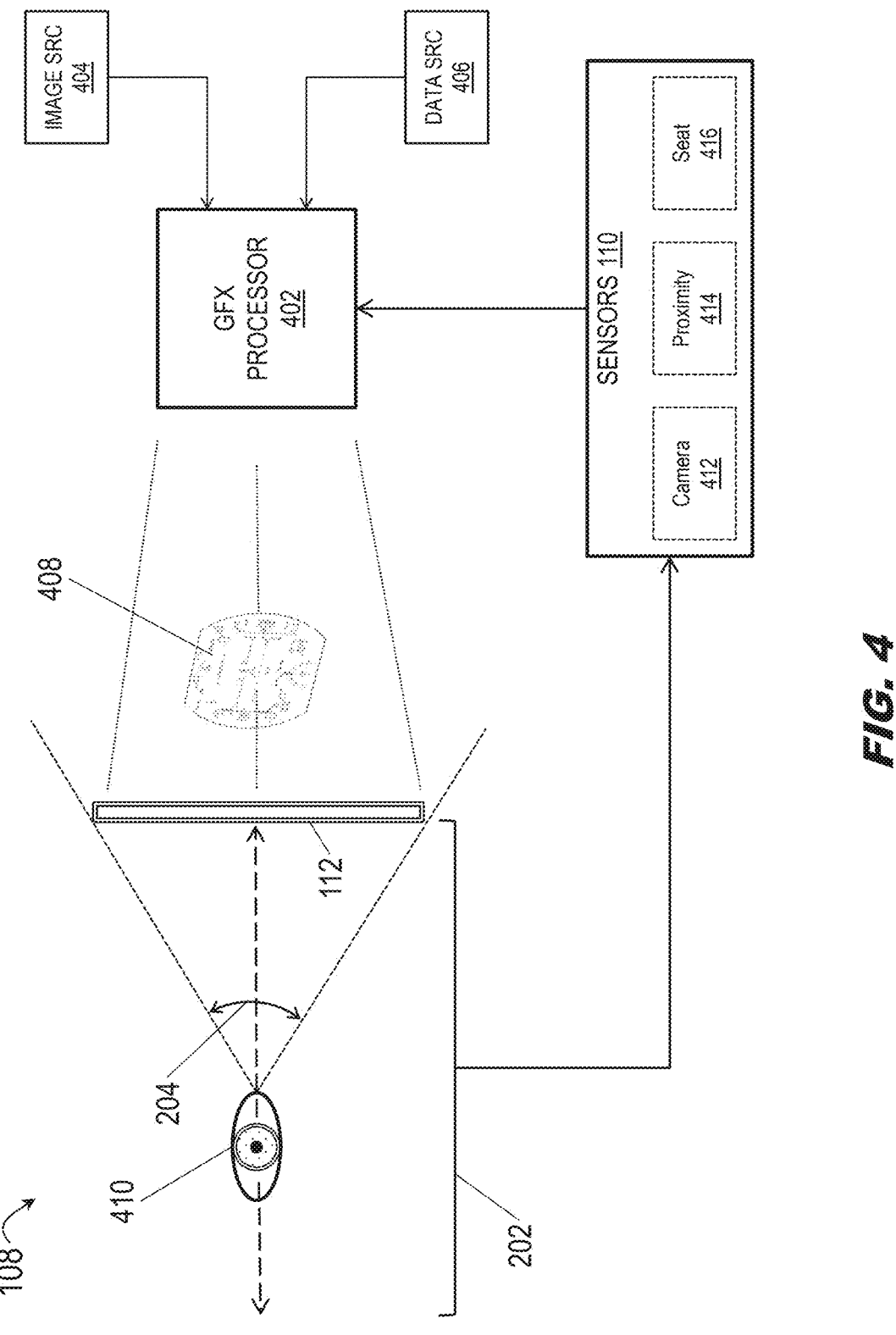
FIG. 4 is a block diagram of a HUD system configured for dynamic field of view (FOV) formatting according to example embodiments of this disclosure.

Referring now to FIG. 4, the HUD 108 is shown.

In embodiments, the HUD 108 may include a graphics processor 402 for generating symbology and/or imagery (e.g., synthetic vision, enhanced vision, combined vision) based on image sources 404 (e.g., internal and external cameras, thermal imagers, infrared imagers) and/or data sources 406 (e.g., avionics systems, aircraft positioning systems, terrain databases, and/or other aircraft based, cloud-based, and/or ground-based sources of flight data). For example, the graphics processor 402 may synthesize display content 408 including imagery and/or symbology and project the display content 408 onto the HUD combiner 112 for viewing by the pilot.

In embodiments, the HUD 108 may incorporate sensors 110 for monitoring the ERP distance 202a-202c between the pilot's eyes 410 and the HUD combiner 112. For example, the sensors 110 may include one or more of: pilot-oriented cameras 412; proximity sensors 414, or seat-based sensors 416. Each of the various types of sensors 110 may, for example, be calibrated for a baseline ERP distance (202a, FIG. 2) corresponding to the eye box (118, FIG. 1) and may report changes in ERP distance 202 relative to the baseline ERP distance (along with changes to the corresponding FOV angle 204). Further, the baseline ERP distance 202a may correspond to a default formatting of display content 408 so as to be optimally perceptible from within the eye box 118.

In embodiments, the graphics processor 402 may receive continual updates as to changes in ERP distance 202a-202c and may reformat or otherwise adjust the display content 408 based on the new ERP distance, such that any critical flight data presented by the HUD 108 is perceptible by the pilot regardless of the current ERP distance.

Figure 5A:
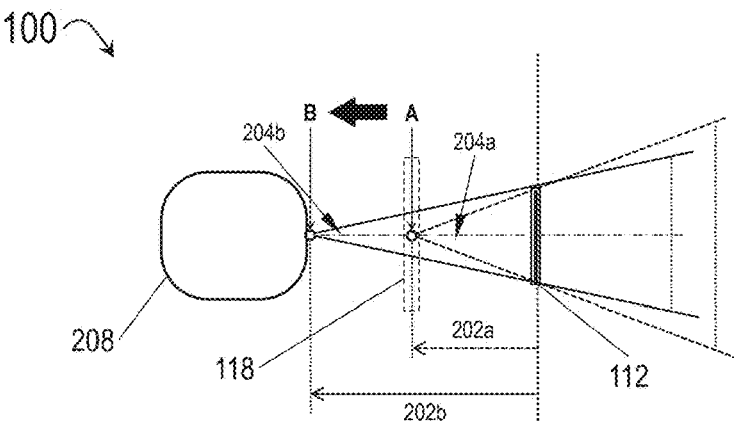
FIGS. 5A and 5B are diagrammatic illustrations of adjustments to content (e.g., imagery and/or symbology) presented by a display unit of the HUD system of FIG. 4 based on movements of the user's eyes relative to the HUD combiner.
Figure 5A:
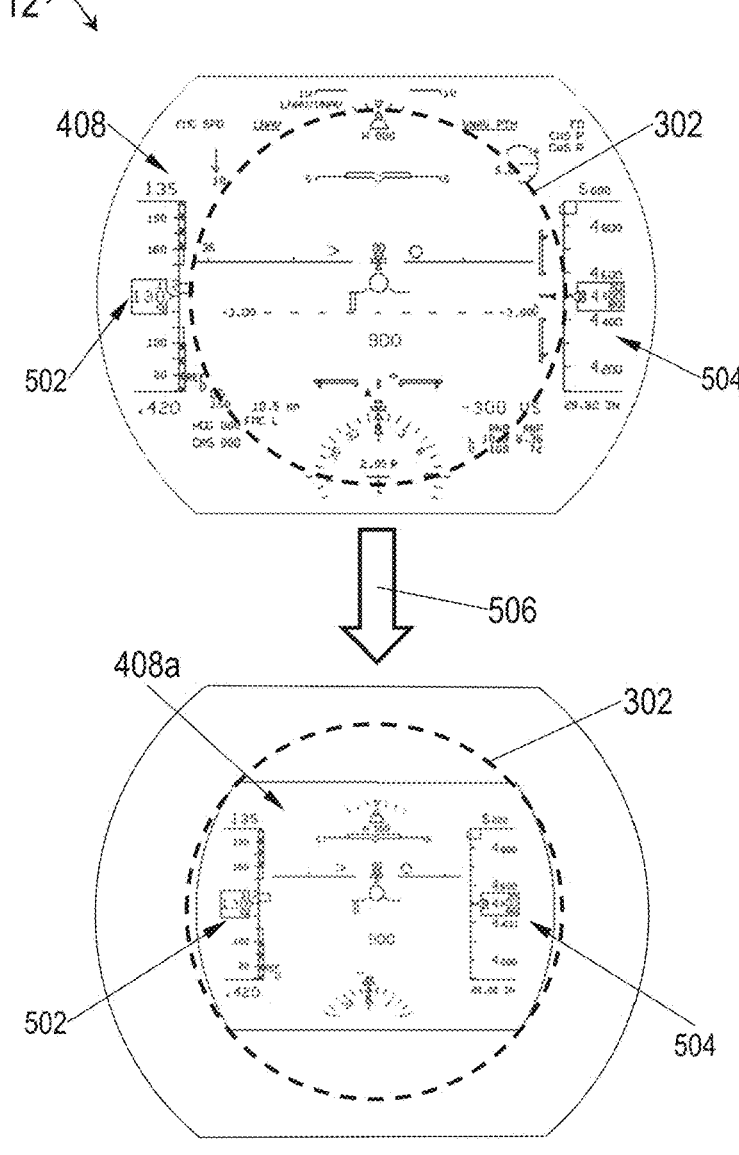
Figure 5B:
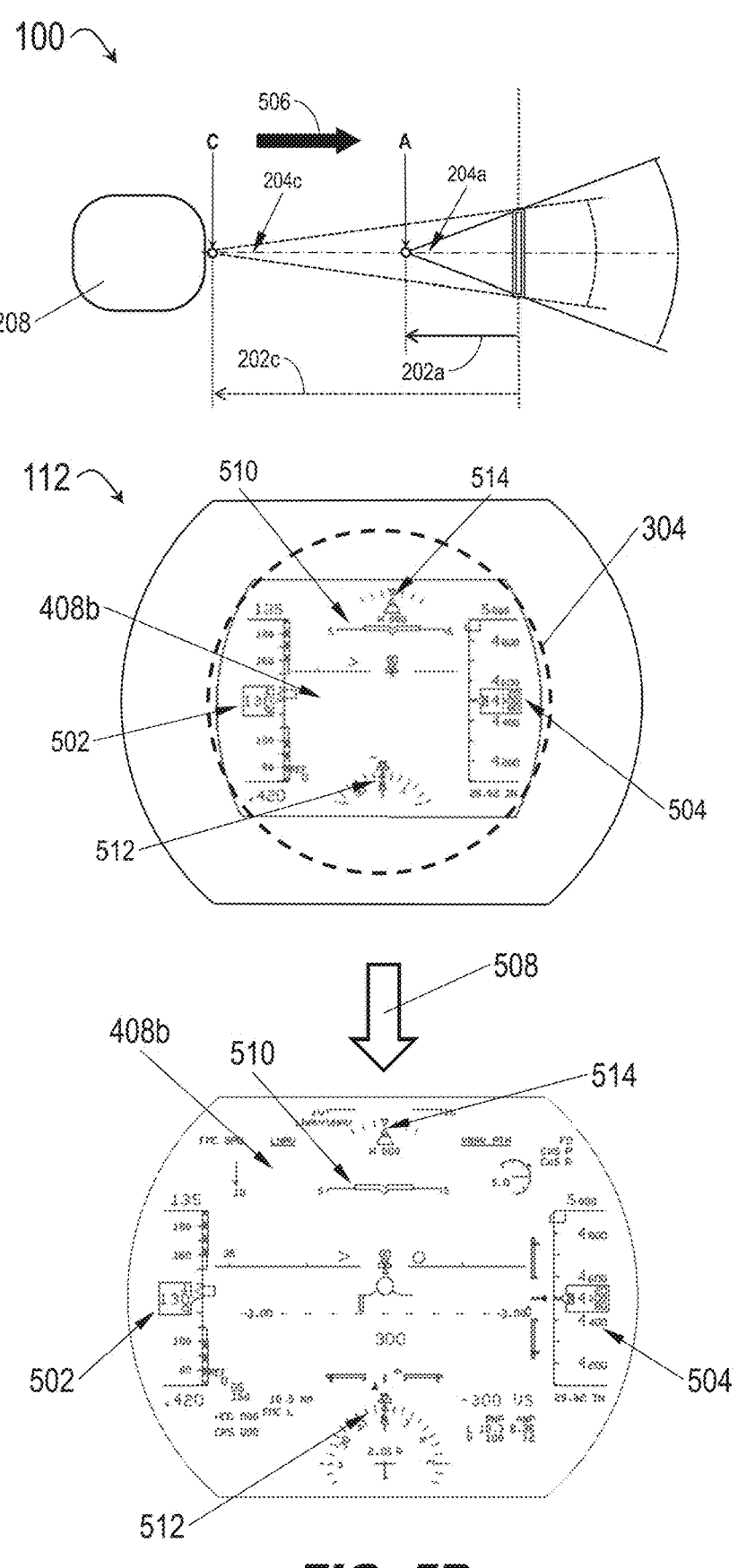

Referring now to FIGS. 5A and 5B, the aircraft 100 is shown.

In embodiments, referring in particular to FIG. 5A, based on the relationship between the ERP distance (202a-202c, FIG. 2; e.g., between the head 208 and/or eyes (410, FIG. 4) of the pilot and the HUD combiner 112), and the corresponding FOV angle (204a-204c, FIG. 2), the HUD 108 may continually monitor the position of the pilot's eyes (e.g., and/or the pilot's head) relative to the HUD combiner 112, and adjust the content displayed by the HUD combiner 112 based on the FOV angle 204 corresponding to the new relative position of the pilot's eyes or head. For example, sensors (110, FIG. 4) may establish a baseline position of the pilot's eyes 410 and head 208 relative to the HUD combiner 112 based on a baseline ERP distance 202a between the eye box 118 and the HUD combiner 112 and the corresponding baseline FOV angle 204a, adjusting the display content (408, FIG. 4) presented by the HUD 108 based on movement relative to the baseline position and narrowing or widening of the corresponding FOV angle 204 to the combiner 112.

In embodiments, the pilot's eyes 410 and head 208 may shift backwards (116) behind the eye box 118 (e.g., from the point A to the point B). For example, the ERP distance 202a may increase to 202b, and the FOV angle 204a may decrease to 204b. As a result of the reduction in FOV angle 204b, only the portion 302 of the display content 408 may be perceptible to the pilot from point B. It may be noted, for example, that the perceptible portion 302 fully excludes both the airspeed indicator 502 and altitude indicator 504 (and may partially exclude other components or indicators).

In embodiments, the sensors (110, FIG. 1) may detect that the pilot's head 208 has receded away from the HUD combiner 112, e.g., from point A to point B, and forward the new ERP distance 202b and/or FOV angle 204b to the HUD graphics processor (402, FIG. 4). For example, upon receiving the updated FOV angle 204b, the graphics processor 402 may compress (506) or otherwise reformat the display content 408a such that all critical data contained within the display content (e.g., the airspeed indicator 502 and the altitude indicator 504) may be perceptible to the pilot within the portion 302 of the HUD combiner 112.

In some embodiments, the HUD graphics processor 402 may reformat the display content 408, 408a by selecting from one of a set or group of predetermined reference data formats. For example, each reference data format of a set of reference data formats may correspond to a particular ERP distance 202a-202c and FOV angle 204a-204c or to a range of possible ERP distances and FOV angles. In other embodiments, the HUD graphics processor may reformat the display content 408, 408a based on an exact ERP distance 202a-202c or FOV angle 204a-204c.

Referring now to FIG. 5B, in embodiments the pilot may move forward (506) toward the HUD combiner 112, such that the pilot's head 208 and eyes (410, FIG. 4) shift forward from point C to point A (as shown by FIG. 2). For example (also referring to FIG. 2), the ERP distance 202c may reduce to an ERP distance 202a (e.g., within the eye box (118, FIG. 5A)); and the corresponding FOV angle 204c may increase to an FOV angle 204a.

In embodiments, the HUD 108 may currently present display content 408b compressed or otherwise formatted to fit entirely within a perceptible portion 304 of the HUD combiner 112, such that the full display content is perceptible by the pilot from point C. However, upon receiving the updated ERP distance 202a and/or updated FOV angle 204a from the sensors 110, the HUD graphics processor 402 may expand (508) or otherwise reformat the display content 408 to reflect that the full HUD combiner 112 is perceptible by the pilot from point A, as the pilot's eyes 410 are within the eye box 118.

In some embodiments, based on the capacity to reformat the display content 408, 408a-408b such that critical information is perceptible by the pilot at any ERP distance 202, 202a-202c, the HUD 108 may operate as a primary flight display (PFD) rather than a head-down display (106, FIG. 1), such that the pilot need not look down to access primary flight information. For example, the HUD 108 may present, as a PFD, an airspeed indicator 502, altitude indicator 504, attitude indicator 510, turn indicator 512, slip/skid indicator 514, and/or other PFD components. Further, the HUD 108 may provide that any reformatting of the display content 408, 408a-408b based on changes in ERP distance 202a-c and FOV angle 204a-204c preserve any and all PFD parameters as perceptible at any ERP distance (e.g., within a predetermined range, outside of which 1) the FOV angle may become so narrow as to be negligible or 2) a rear wall, bulkhead or other obstruction within the cockpit or control area may be encountered, the obstruction blocking further movement away from the combiner 112).

Figure 6:
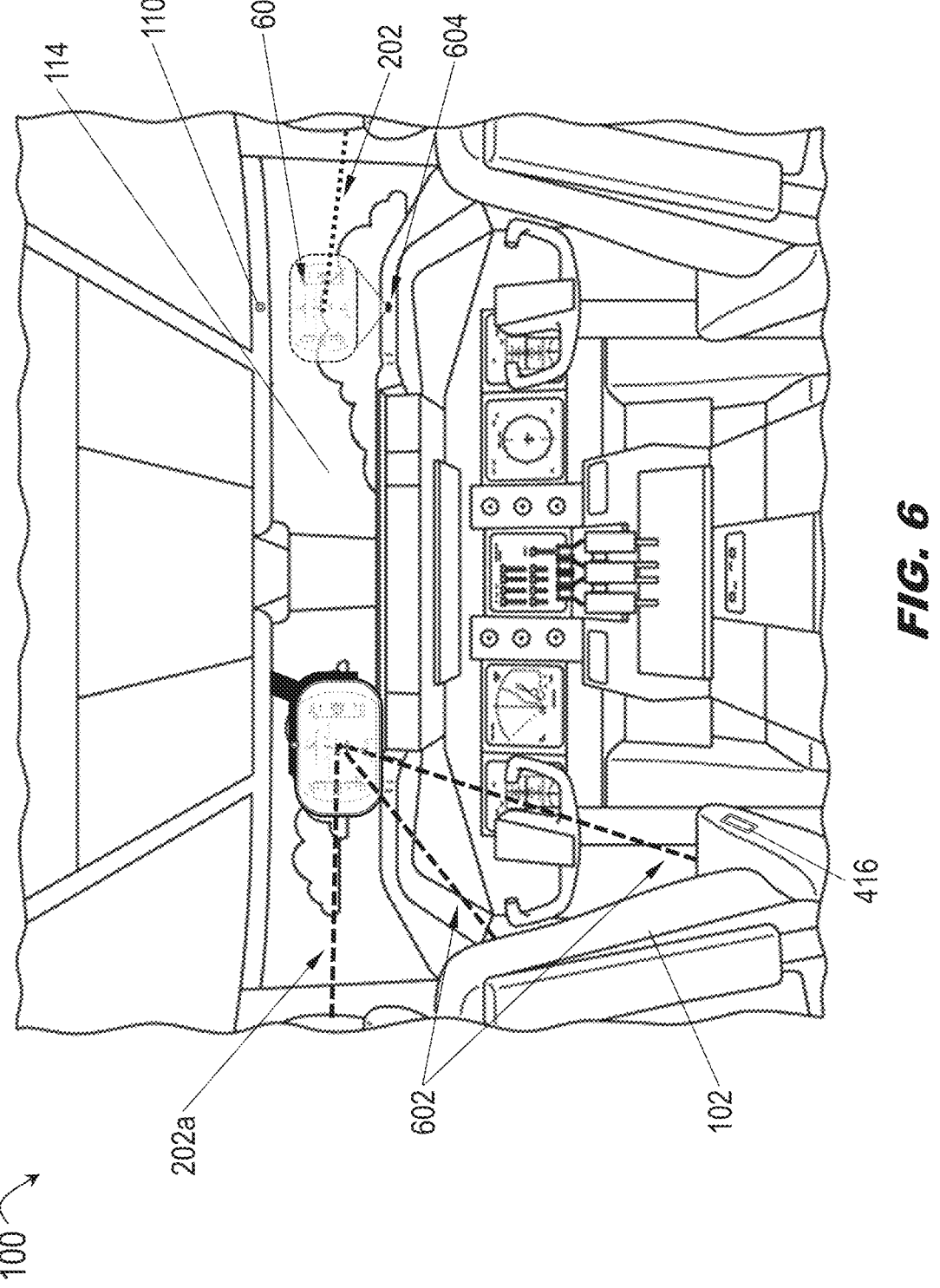
FIG. 6 is an illustration of the aircraft cockpit of FIG. 1 featuring alternative locations for HUD displays and ERP distance sensors of the HUD system of FIG. 4 according to example embodiments of this disclosure.

Referring now to FIG. 6, the aircraft 100 is shown.

In embodiments, the baseline ERP distance 202a and corresponding baseline FOV angle (204a, FIG. 2) corresponding to the eye box (118, FIG. 1) may likewise be based on a baseline distance of the pilot seat 102 (or, e.g., the co-pilot seat 104) from the HUD combiner 112. For example, sensors 416 may be disposed within the pilot seat 102 and may continually track movement (e.g., longitudinal tracking) of the pilot seat forward or backward relative to the baseline distance from the HUD combiner 112. In an embodiment, the graphic processor (402, FIG. 4) may receive position data from the pilot-seat based sensors 416 (e.g., a current seat distance 602 between the pilot seat 102 and HUD combiner 112) and infer therefrom a current ERP distance and/or FOV angle (202, 204; FIG. 4). Similarly, based on the inferred ERP distance 202 and/or FOV angle 204, the graphic processors 402 may compress, expand, or otherwise reformat the display content (408, FIG. 4) such that the display content 408 is fully perceptible by the pilot at the current seat distance 602.

In some embodiments, the HUD 108 may incorporate a projector 604 configured to project display content 606 directly onto the forward windscreen 114 (e.g., or a like transparent surface within the pilot's or co-pilot's line of sight). For example, the HUD graphic processors 402 may be configured for reformatting the display content 606 based on a sensed ERP distance 202 (e.g., relative to a baseline ERP distance 202a) between the forward windscreen 114 and the pilot's eyes (410, FIG. 4), e.g., collected by sensors 110.

Referring now to FIG. 7, an aircraft-based method 700 for dynamic formatting of a head-up display (HUD) may include the following steps.

At a step 702, a head-up display (HUD) mountable to an aircraft or other vehicle (e.g., within an aircraft cockpit, in line of sight/field of view of the user) provides flight display data generated by a HUD graphic processor and based on flight information received from aircraft avionics systems and/or positioning systems. In some embodiments, the HUD provides a primary flight display (PFD). In some embodiments, the HUD includes a partially or fully transparent combiner mounted in the pilot's or co-pilot's line of sight. In some embodiments, the vehicle is a ground-based or water-based vehicle, and the display data is based on environmental information collected by vehicle-based sensors.

At a step 704, sensors disposed within the aircraft determine a current eye reference point (ERP) distance between the pilot's eyes and the HUD combiner, the ERP distance corresponding to a field of view (FOV) angle and the FOV angle corresponding to a portion of the display data perceptible to the pilot from that ERP distance. In some embodiments, the sensors include a pilot-facing camera. In some embodiments, the sensors include proximity sensors. In some embodiments, the sensors are disposed within a pilot seat or co-pilot seat to measure forward or backward movement of the seat relative to a baseline location corresponding to an optimal HUD distance or "eye box" (e.g., a baseline ERP distance from which HUD content is optimally perceptible).

At a step 706, the HUD graphic processors adjust the formatting of flight display data presented by the HUD combiner based on an increase or decrease in ERP distance and the corresponding FOV angle between the pilot's eyes and the HUD combiner (e.g., relative to the optimal "eye box" ERP distance). For example, if the pilot's eyes recede away from the HUD combiner (e.g., increased ERP distance, narrower FOV angle), the HUD graphic processors compress the display content so critical information remains perceptible within a reduced portion of the HUD combiner. Similarly, if the pilot's eyes advance toward the HUD combiner, the graphic processors expand the display content to reflect a larger perceptible portion of the HUD combiner based on the decreased ERP distance and/or broader FOV angle. In some embodiments, the HUD graphic processors reformat the display by selecting from a set of discrete reference formats, e.g., each reference format corresponding to a range of ERP distances.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A head-up display (HUD) system, comprising:
a display unit mountable to a vehicle, the display unit comprising:
at least one graphics processor communicatively coupled to one or more sensing systems of the vehicle, the graphics processor configured to receive environmental information from the one or more sensing systems and to generate display data based on the received environmental information;

and
a display surface oriented within a field of view (FOV) of a user, the display surface configured to present the generated display data to the user;
and
at least one sensor operatively coupled to the HUD, the at least one sensor configured to dynamically track and determine a current eye reference point (ERP) distance between a head of the user and the display surface, wherein the distance between the head of the user and the display surface is dynamic;
wherein the at least one graphics processor is configured to adjust the display data by narrowing or widening the display data based on the current ERP distance relative to a baseline ERP distance and angle from the display surface.

2. The HUD system of claim 1, wherein the graphics processor is configured to compress the display data based on an increase in the determined ERP distance.

3. The HUD system of claim 1, wherein the graphics processor is configured to adjust the display data by redrawing the display data according to a reference format selected from a group of two or more reference formats.

4. The HUD system of claim 1, wherein the display surface includes an at least partially transparent combiner, the combiner mounted within the field of view of the user.

5. The HUD system of claim 1, wherein the display surface is an interior surface of the vehicle, the HUD system further comprising:
a projector coupled to the graphics processor, the projector configured to project the generated display data onto the display surface.

6. The HUD system of claim 5, wherein the display surface includes at least one of a windscreen or a window of the vehicle.

7. The HUD system of claim 1, wherein:
the vehicle is an aircraft;
the one or more sensing systems include one or more avionics systems;
and
the display data includes flight display data.

8. The HUD system of claim 7, wherein the flight display data corresponds to a primary flight display (PFD).

9. The HUD system of claim 1, wherein the at least one sensor includes at least one of a camera or a proximity sensor.

10. The HUD system of claim 1, wherein:
the FOV and the current ERP distance are associated with a seat configured for occupation by the user;
and
the at least one sensor includes one or more sensors disposed within the seat.

11. A vehicle-based method for dynamic formatting of a head-up display (HUD), the method comprising:
providing to a user, via a display surface of a head-up display (HUD) mountable to a vehicle, display data generated by a graphics processor, the display data based on environmental information received from one or more sensing systems of the vehicle, and the display surface within a field of view (FOV) of the user;
sensing, via at least one sensor disposed within the vehicle, a dynamic current eye reference point (ERP) distance between the display surface and a head of the user, wherein the distance between the head of the user and the display surface is dynamic; and adjusting, via the graphics processor, the display data by narrowing or widening the display data based on the current ERP distance or angle relative to a baseline ERP distance and angle from the display surface.

12. The vehicle-based method of claim 11, wherein sensing, via the at least one sensor disposed within the vehicle, the current ERP distance between the display surface and the head of the user, includes:

sensing, via at least one of a camera or a proximity sensor, the current ERP distance between the display surface and the head of the user.

13. The vehicle-based method of claim 11, wherein the user is associated with a seat configured to accommodate the user and wherein sensing, via the at least one sensor disposed within the vehicle, the current ERP distance between the display surface and the head of the user, includes:

sensing, via at least one sensor disposed within the seat, the current ERP distance between the display surface and the head of the user.

14. The vehicle-based method of claim 11, wherein adjusting, via the graphics processor, the display data based on the current ERP distance includes:

compressing the display data based on an increase in the current ERP distance.

15. The vehicle-based method of claim 11, wherein adjusting, via the graphics processor, the display data based on the current ERP distance includes:

redrawing the display data according to a reference format selected from a group of two or more reference formats.

16. The vehicle-based method of claim 11, wherein providing to the user, via the display surface of the head-up display (HUD) mountable to the vehicle, display data generated by the graphics processor includes:

providing to the user, via an at least partially transparent combiner of the HUD, the display data.

17. The vehicle-based method of claim 11, wherein providing to the user, via the display surface of the head-up display (HUD) mountable to the vehicle, display data generated by the graphics processor includes:

projecting, via a projector operatively coupled to the graphics processor, the display data onto the display surface of the vehicle, the display surface within the field of view (FOV) of the user.

18. The vehicle-based method of claim 17, wherein projecting, via the projector operatively coupled to the graphics processor, the display data onto the display surface of the vehicle, the display surface within the field of view (FOV) of the user includes:

projecting the display data onto at least one of a windscreen or a window of the vehicle.

19. The vehicle-based method of claim 11, wherein the vehicle is an aircraft, and:

wherein providing to the user, via the display surface of the head-up display (HUD) mountable to the vehicle, display data generated by the graphics processor, the display data based on environmental information received from one or more sensing systems of the vehicle, includes:

providing to the user, via the display surface of the HUD mountable to an aircraft, flight display data generated by the graphics processor, the flight display data based on flight data received from one or more avionics systems of the vehicle.

20. The vehicle-based method of claim 19, wherein providing to the user, via the head-up display (HUD) mountable to the aircraft, flight display data generated by the graphics processor includes:

providing to the user, via the HUD, a primary flight display (PFD).

* * * * *